United States Patent
Liu et al.

(10) Patent No.: US 12,493,727 B2
(45) Date of Patent: Dec. 9, 2025

(54) METHOD FOR PREPARING SMALL-SCALE MODEL OF BUCKLING-CONTROLLED BRACE DEVICE WITH ROTATIONALLY SYMMETRIC CROSS SECTION

(71) Applicant: Chongqing Jiaotong University, Chongqing (CN)

(72) Inventors: Yangqing Liu, Chongqing (CN); Ping Fan, Chongqing (CN); Yiyuan Zhao, Chongqing (CN); Zhiqiang Liu, Chongqing (CN); Xinyu Cai, Chongqing (CN); Guotao Qin, Chongqing (CN); Jianguo Cai, Chongqing (CN); Jian Feng, Chongqing (CN); Jianting Zhou, Chongqing (CN)

(73) Assignee: Chongqing Jiaotong University, Chongqing (CN)

( * ) Notice: Subject to any disclaimer, the term of this patent is extended or adjusted under 35 U.S.C. 154(b) by 0 days.

(21) Appl. No.: 19/212,732

(22) Filed: May 20, 2025

(65) Prior Publication Data
US 2025/0356074 A1 Nov. 20, 2025

(30) Foreign Application Priority Data
May 20, 2024 (CN) .......................... 202410634761.6

(51) Int. Cl.
*G06F 30/17* (2020.01)

(52) U.S. Cl.
CPC ................... *G06F 30/17* (2020.01)

(58) Field of Classification Search
CPC ..... G06F 30/00; G06F 30/17; G05B 19/4145; G05B 2119/33099

(Continued)

(56) References Cited

U.S. PATENT DOCUMENTS

| 5,028,474 A | 7/1991 | Czaplicki |
| 2021/0261197 A1* | 8/2021 | Czinger ............... G06F 30/17 |
| 2023/0183971 A1* | 6/2023 | Stants ................ E04B 1/3449 |
| | | 52/506.06 |

FOREIGN PATENT DOCUMENTS

| CN | 105971143 A | 9/2016 |
| CN | 205686171 U | 11/2016 |

(Continued)

OTHER PUBLICATIONS

Yan-Lin Guo, et al., Research Progress on Design Theory of Assembled Buckling-restrained Brace, Journal of Architecture and Civil Engineering, 2013, pp. 1-12, vol. 30, No. 1.

(Continued)

*Primary Examiner* — Cedric Johnson
(74) *Attorney, Agent, or Firm* — Bayramoglu Law Offices LLC

(57) ABSTRACT

A small-scale model of a buckling-controlled brace device with a rotationally symmetric cross section is provided. The preparation method includes the following steps: S100. a CNC machine tool cuts into sub-energy-dissipation segments on a flat steel plate along a panel group I and a panel group II split by the fifteenth and sixteenth edges, the panel group I includes the ninth edge, the fifteenth edge, the sixteenth edge, the thirteenth edge, the eighth edge, the eleventh edge and the fourth edge, and the panel group II includes the tenth edge, the second edge, the sixth edge, the fourteenth edge, the sixteenth edge, the twelfth edge and the fifteenth edge; S200. connecting the panel group I and the panel group II in S100 by oblique hill creases, to form the sub-energy-dissipation segments; and S300. connecting the four groups of sub-energy-dissipation segments in S200 along a direction of the eleventh edge.

1 Claim, 6 Drawing Sheets

(58) Field of Classification Search
USPC .................................................. 703/7, 6, 1
See application file for complete search history.

(56) References Cited

FOREIGN PATENT DOCUMENTS

| | | | | | |
|---|---|---|---|---|---|
| CN | 108691358 | A | 10/2018 | | |
| CN | 210713319 | U | 6/2020 | | |
| CN | 211448312 | U | 9/2020 | | |
| CN | 112376739 | A | 2/2021 | | |
| CN | 114319933 | A | 4/2022 | | |
| CN | 116180923 | A | 5/2023 | | |
| CN | 116838748 | A | * 10/2023 | .............. | F16F 15/02 |
| WO | WO-2024215296 | A1 | * 10/2024 | ........... | E04H 9/0237 |

OTHER PUBLICATIONS

Xiao Li, et al., A Review of Origami and Its Crease Design, Chinese Journal of Theoretical and Applied Mechanics, 2018, pp. 467-476, vol. 50, No. 3.

* cited by examiner

METHOD FOR PREPARING SMALL-SCALE MODEL OF BUCKLING-CONTROLLED BRACE DEVICE WITH ROTATIONALLY SYMMETRIC CROSS SECTION

CROSS-REFERENCE TO THE RELATED APPLICATIONS

This application is based upon and claims priority to Chinese Patent Application No. 202410634761.6, filed on May 20, 2024, the entire contents of which are incorporated herein by reference.

TECHNICAL FIELD

The present disclosure relates to the technical field of energy-dissipation brace of building structures, and in particular to a method for preparing a small-scale model of a buckling-controlled brace device with a rotationally symmetric cross section.

BACKGROUND

In the concentrically braced steel frame system, the concentric steel brace under axial force provides the initial stiffness for the structure. However, it is prone to overall bending buckling and instability under axial compression. In order to solve the instability problem of the concentric steel brace, the overall buckling of the inner core is suppressed by external constraining segments so that only axial deformations occur, and a buckling-restrained brace composed of external constraining segments, internal core materials and unbonded materials is formed. However, there are also some problems for the brace, for example, heavy self-weight, the external constraining segments sliding along the length direction of the component, unbonded materials easy to be scraped, high requirements for plastic deformation ability of the inner core, difficulties in detecting damage in the inner core, and the like.

In the prior art, the professionals in this field apply an origami-patterned energy-dissipation structure to a buckling-restrained brace device to improve its performance, but there are still hidden dangers: an origami-patterned energy-dissipation structure with too large slenderness ratio is prone to overall buckling. In view of the above problems, professionals have proposed two methods: setting a straight section in the middle of the brace and setting a restraint sleeve outside the origami-patterned energy-dissipation structure, but neither of the methods has an ideal effect.

In order to solve the above problems, a buckling-controlled brace device with a rotationally symmetric cross section is adopted. The device is composed of an energy-dissipation segment and two constraint segments at ends. The two ends of the energy-dissipation segment are installed with end plates respectively, and the two constraint segments at ends are connected to the two end plates respectively. The origami configuration controls the overall out-of-plane buckling of the component under axial compression. Meanwhile, it allows the entire length of the brace to enter yield along the predetermined creases under axial load, thereby providing a good hysteretic energy-dissipation capacity. On the one hand, the buckling-controlled brace can avoid the defects of the significant difference between the tensile and compressive bearing capacity of the ordinary brace. On the other hand, the buckling-controlled brace has the function of a metal damper, which can act as a 'fuse' in the structure and protect the main structure from premature failure under earthquake action. The application of the buckling-controlled brace can comprehensively improve the seismic performance of the braced frame under moderate and strong earthquakes, so as to avoid endangering the lives and property of the occupants.

The above buckling-controlled brace device has good application prospects and research significance. In order to facilitate the experimental study of the device before application, it is necessary to prepare a small-scale model of the device. After persistent trials and errors, the present disclosure proposes a method for preparing a small-scale model of the device. At present, the preparation methods of origami components mainly include the following categories: a. a preparation method of integral forming by applying external load, the most typical way of which is using customized mold extrusion to form origami configuration. However, using this method to prepare origami configurations with different geometric sizes requires customizing different molds, which is expensive and not suitable for batch preparation of small-scale models of buckling-controlled brace devices in the present disclosure; b. a preparation method using the incompatibility of internal stress (also known as self-folding technology), which makes the creases self-fold under external excitation (including but not limited to heat, humidity, and light) without the need for external load assistance. However, this method requires strict control of external excitation under laboratory conditions. Meanwhile, the creases need to be made of smart materials, including but not limited to shape memory alloys and hydrogels. It is difficult to meet the requirements of batch preparation of small-scale models of buckling-controlled brace devices using commonly used steel in the present disclosure; and c. Three-dimensional (3D) printing metal technology, a rapid prototyping technology, also known as additive manufacturing, constructs objects by successively depositing layers of bondable materials, including but not limited to powdered metal or plastic based on a digital model file. The technology often causes voids between the stacked metal particles, resulting in insufficient compactness inside the metal, especially the failure to guarantee the tensile strength of the metal material. In general, the above preparation methods are not suitable for the small-scale model of the buckling-controlled brace device in the present disclosure. Considering the preparation requirements of the small-scale model of the buckling-controlled brace device, the present disclosure proposes a preparation method suitable for the model.

SUMMARY

In order to solve the above problems, the technical solutions adopted by the present disclosure are:

A method for preparing a small-scale model of a buckling-controlled brace device with a rotationally symmetric cross section, wherein, the small-scale model of the buckling-controlled brace device with the rotationally symmetric cross section includes an energy-dissipation segment, the energy-dissipation segment includes four groups of sub-energy-dissipation segments connected end to end in turn in a circumferential direction, a basic unit of the sub-energy-dissipation segments after flattening includes two congruent parallelograms connected by overlapping edges, three edges of the parallelograms in a horizontal direction are all divided into two unequal lengths, both the top and bottom edges are connected to overlapping edges by edges with the same length, and finally forming sixteen edges; in the basic unit of the sub-energy-dissipation segments after flattening, performing a valley fold at the fourth and eighth edges, and performing a hill fold at the fifteenth and sixteenth edges, to form a basic origami unit, and the preparation method includes the following steps:

S100. a computer numerical control (CNC) machine tool cuts into sub-energy-dissipation segments on a flat steel plate along a panel group I and a panel group II split by the fifteenth and sixteenth edges, wherein the panel group I includes the ninth edge, the fifteenth edge, the sixteenth edge, the thirteenth edge, the eighth edge, the eleventh edge and the fourth edge; and the panel group II includes the tenth edge, the second edge, the sixth edge, the fourteenth edge, the sixteenth edge, the twelfth edge and the fifteenth edge;

S200. connecting the panel group I and the panel group II in S100 by oblique hill creases, to form the sub-energy-dissipation segments; and S300. connecting the four groups of sub-energy-dissipation segments in S200 along a direction of the eleventh edge, to form an energy-dissipation segment of the rotationally symmetric tubular structure.

Further, in S100, using horizontal creases in the interior of the panel group I and the panel group II, wherein the horizontal creases only transfer displacement and do not transfer out-of-plane bending moment.

Further, a preparation method of the horizontal creases includes the following steps:

S110. continuously and evenly drilling the horizontal creases on the panel group I and the panel group II into several circular holes;

S120. locally annealing the horizontal creases of the circular holes by an acetylene flame, to compensate for the loss of deformation capacity caused by the weakening of the cross section; and S130. after completing the annealing, accurately bending the panel group I and the panel group II to a specified angle along the horizontal creases by a CNC bending machine.

Further, in S200, the oblique hill creases only transfer the displacement and do not transfer the out-of-plane bending moment.

Further, a preparation method of the oblique hill creases includes the following steps:

S210. bending a thinner first connecting plate with a first preformed clearance hole to a specified angle by a CNC bending machine;

S220. placing the two adjacent panels of the panel group I and the panel group II with a preformed first pilot hole in a hill shape, and placing the first connecting plate on a hill side;

S230. arranging a first cushion plate with a second preformed clearance hole on a hill side of the first connecting plate; and S240. when assembling, installing a first self-tapping screw from outside to inside with a drill, passing through the second preformed clearance hole on the first cushion plate and the first preformed clearance hole on the first connecting plate in turn via self-tapping screw threads; forming a drilled hole at the first pilot hole on the two adjacent panels of the panel group I and the panel group II, to make the screw threads bite tightly with the sides of the drilled hole.

Further, in S300, the connection between the four groups of sub-energy-dissipation segments is oblique valley creases, and the oblique valley creases transfer displacement and out-of-plane bending moment simultaneously.

Further, a preparation method of the oblique valley creases includes the following steps:

S310. bending a thicker second connecting plate with a third preformed clearance hole to a specified angle by the CNC bending machine;

S320. placing the two adjacent panels with a preformed second pilot hole of the panel group I and the panel group II in a valley shape, and placing the second connecting plate on a valley side;

S330. arranging a second cushion plate with a fourth preformed clearance hole on a valley side of the second connecting plate; and S340. when assembling, installing a second self-tapping screw from outside to inside with a drill, passing through the fourth preformed clearance hole on the second cushion plate and the third preformed clearance hole on the second connecting plate in turn via self-tapping screw threads, and forming a drilled hole at the second pilot hole on the two adjacent panels of the panel group I and the panel group II, to make the screw threads bite tightly with the sides of the drilled hole.

The beneficial effects of the present disclosure are as follows:

(1) Reasonable disassembly. The complex structure is reasonably disassembled into repeated panel groups, and the preparation of complex structures is simplified to the preparation of simple panel groups and connecting plates, which creates conditions for the realization of assembly preparation.

(2) The assembly preparation method is realized, and unnecessary stressing is avoided. The energy-dissipation segment is only composed of segments and does not require additional filling materials. The energy-dissipation segment is composed of 8 panel groups, which has a good forming accuracy and effectively avoids the geometric interference and material tearing problems in the preparation process. Meanwhile, welding is almost not used except for the end plate connections, which avoids the adverse effect of welding residual stress on the support force.

(3) The assembly preparation method is realized, which is conducive to batch production. By using parts of the same size and specifications, the standardization of model production is realized, the preparation quality of the model is ensured, and the preparation efficiency of the model is improved, which provides an important reference for the industrial production of full-scale members of buckling-restrained braces with rotationally symmetric cross sections.

Figure 1:
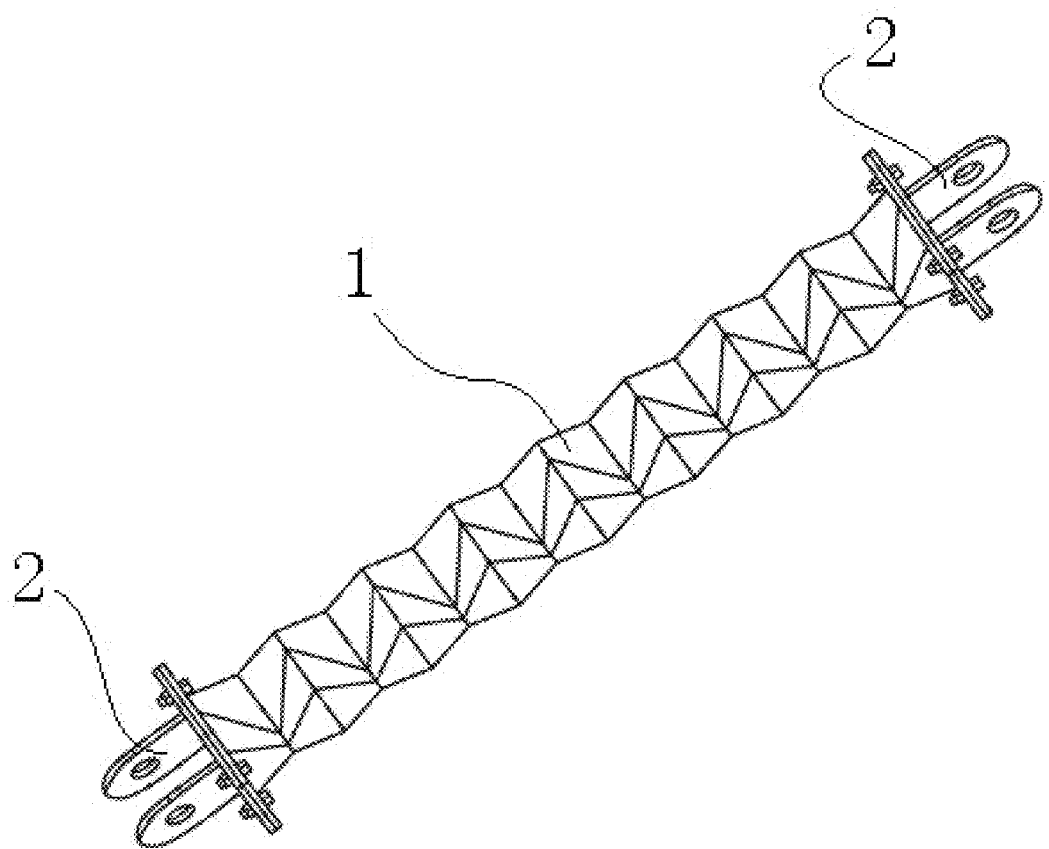
FIG. 1 is a schematic diagram of the present disclosure.
Figure 2:
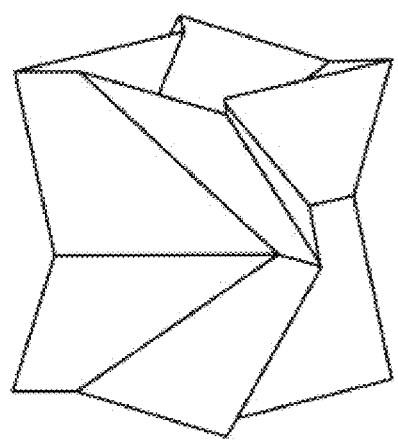
FIG. 2 is a schematic diagram of an energy-dissipation segment.
Figure 3:
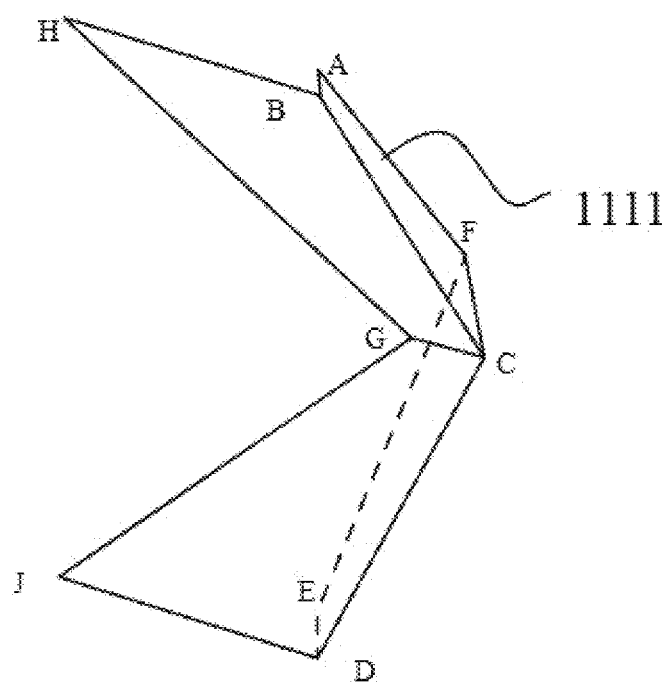
FIG. 3 is a schematic diagram of a basic origami unit.

In the drawings, 1. energy-dissipation segment; 1111. basic origami unit; 2. end constraint segment; 3. sub-energydissipation segment; 4. panel group I; 5. panel group II; 6. horizontal crease; 7. oblique hill crease; 8. circular hole; 9. first pilot hole; 10. second pilot hole; 11. first connecting plate; 12. first cushion plate; 13. first self-tapping screw; 14. first preformed clearance hole; 15. second preformed clearance hole; 16. second connecting plate; 17. second cushion plate; 18. second self-tapping screw; 19. third preformed clearance hole; 20. fourth preformed clearance hole; and 21. oblique hill crease.

DETAILED DESCRIPTION OF THE EMBODIMENTS

The present disclosure provides a method for preparing a small-scale model of a buckling-controlled brace device with a rotationally symmetric cross section. Detailed descriptions of the technical solutions of the present disclosure are provided below in conjunction with the accompanying drawings to facilitate comprehension and implementation.

Referring to FIGS. 1-10, a method for preparing a small-scale model of a buckling-controlled brace device with a rotationally symmetric cross section, wherein, the small-scale model of the buckling-controlled brace device with the rotationally symmetric cross section includes an energy-dissipation segment 1, an end plate connected to both ends of the energy-dissipation segment 1, and an end constraint segment 2 connected to the end plate; the energy-dissipation segment 1 includes four groups of sub-energy-dissipation segments 3 connected end to end in turn in the circumferential direction; a basic unit of the sub-energy-dissipation segments 3 after flattening includes two congruent parallelograms connected by overlapping edges, three edges of the parallelograms in the horizontal direction are all divided into two unequal lengths, and both the top and bottom edges are connected to overlapping edges by edges with the same length, and finally form sixteen edges.

Figure 4:
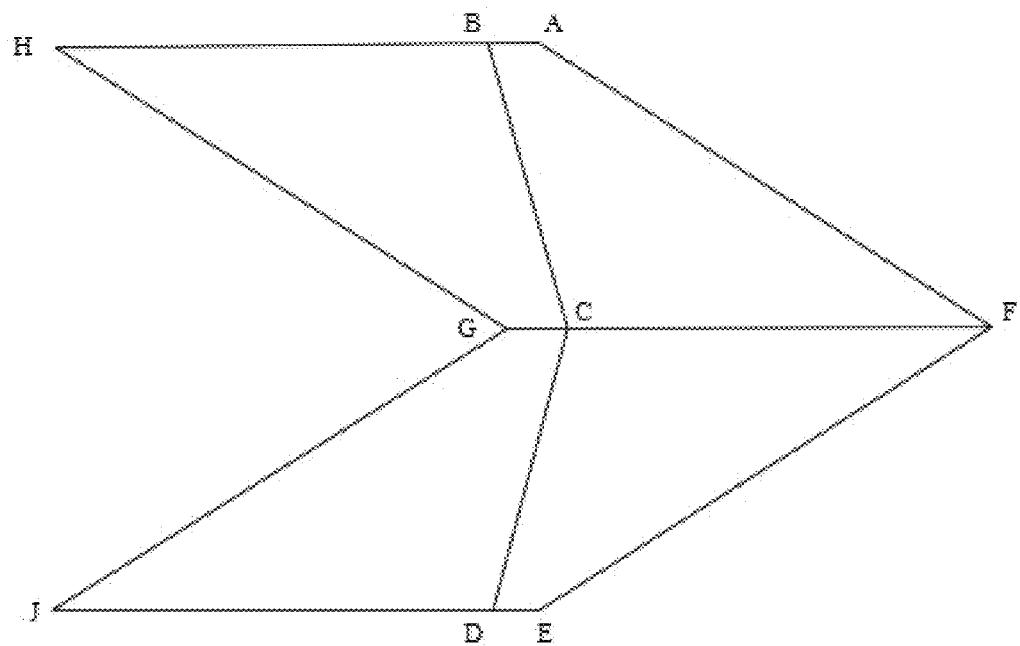
FIG. 4 is a schematic diagram of a basic unit after flattening.
Figure 5:
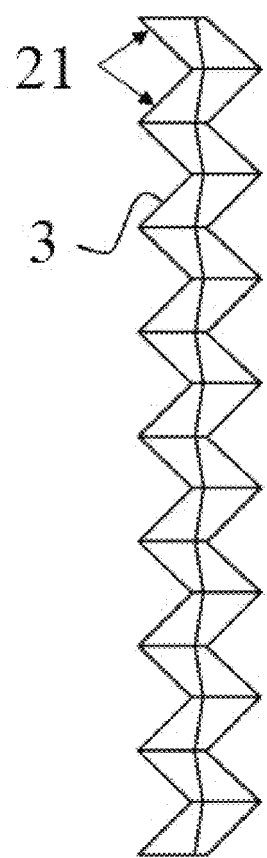
FIG. 5 is a schematic diagram of a flattened sub-energy-dissipation segment.
Figure 6:
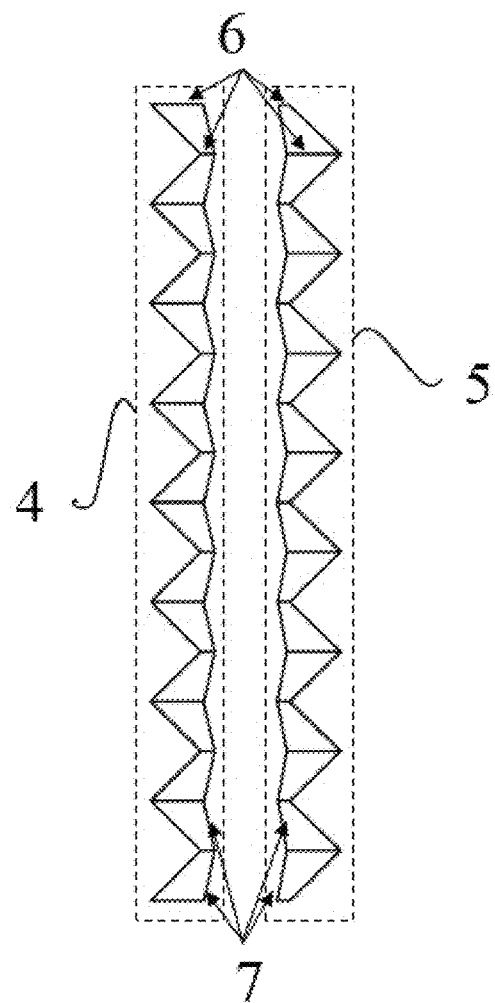
FIG. 6 is a schematic diagram of a sub-energy-dissipation after disassembly.
Figure 7:
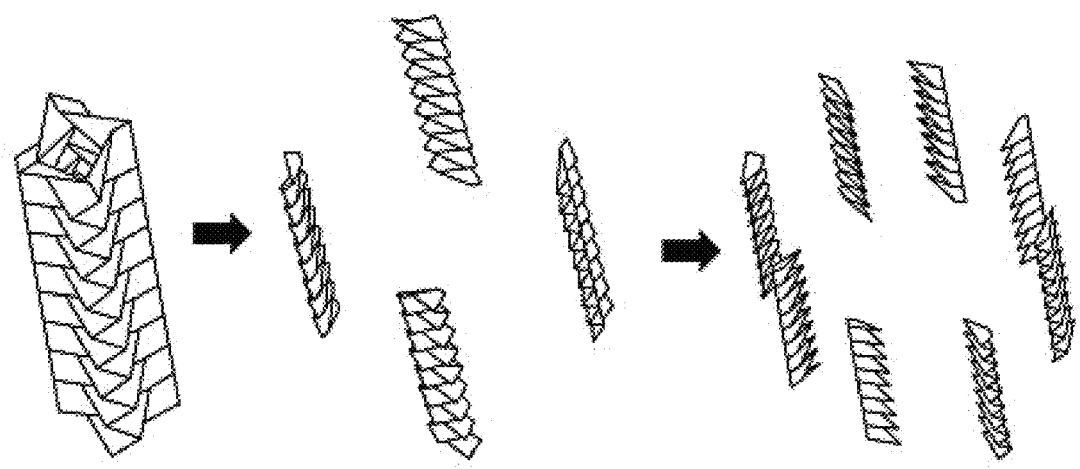
FIG. 7 is a schematic diagram of a disassembled energy-dissipation segment.

As shown in FIG. 4, the shape of the basic unit of sub-energy-dissipation segments 3 after flattening is two identical first parallelogram HAFG and second parallelogram GFEJ, in the first parallelogram, the first, second, third and fourth edges correspond to line segment HA, line segment AF, line segment FG and line segment GH respectively, in the second parallelogram, the fifth, sixth, seventh and eighth edges correspond to line segment GF, line segment FE, line segment EJ and line segment JG respectively, wherein, the third edge and the fifth edge overlap, that is, the line segment FG is the line segment GF; point B, point C and point D are located on line segment HA, line segment FG and line segment EJ, respectively, that is, the first edge (line segment HA) is divided into the ninth edge (line segment HB) and the tenth edge (line segment BA) connected to the end of the ninth edge (line segment HB), the third edge (line segment FG) is divided into the eleventh edge (line segment GC) and the twelfth edge (line segment CF) connected to the end of the eleventh edge (line segment GC), the seventh edge (line segment EJ) is divided into the thirteenth edge (line segment JD) and the fourteenth edge (line segment DE) connected to the end of the thirteenth edge (line segment JD); the length of the ninth edge (line segment HB), the twelfth edge (line segment CF), and the thirteenth edge (line segment JD) is greater than the length of the tenth edge (line segment BA), the eleventh edge (line segment GC), and the fourteenth edge (line segment DE), respectively; the lengths of the ninth edge (line segment HB), the twelfth edge (line segment CF) and the thirteenth edge (line segment JD) are all equal; and the ninth edge (line segment HB) is connected to the twelfth edge (line segment CF) through the fifteenth edge (line segment BC), and the thirteenth edge (line segment JD) is connected to the twelfth edge (line segment CF) through the sixteenth edge (line segment DC), and the length of the fifteenth edge (line segment BC) is equal to the length of the sixteenth edge (line segment DC).

In the basic unit of the sub-energy-dissipation segments 3 after flattening, performing a valley fold at the fourth edge (line segment GH) and the eighth edge (line segment JG), and performing a hill fold at fifteenth edge (line segment BC) and the sixteenth edge (line segment DC), to form a basic origami unit 1111.

Figure 8:
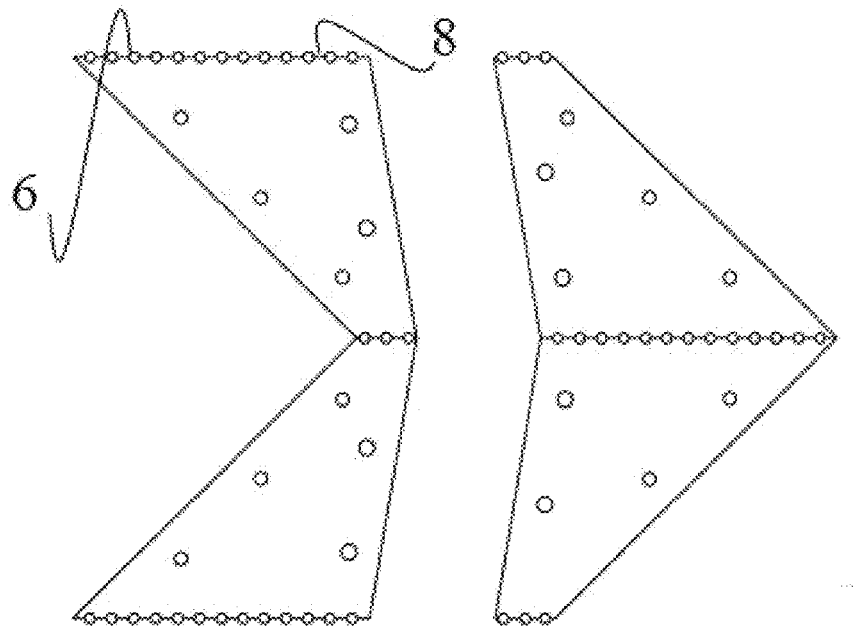
FIG. 8 is a schematic diagram of a horizontal crease.
Figure 9:
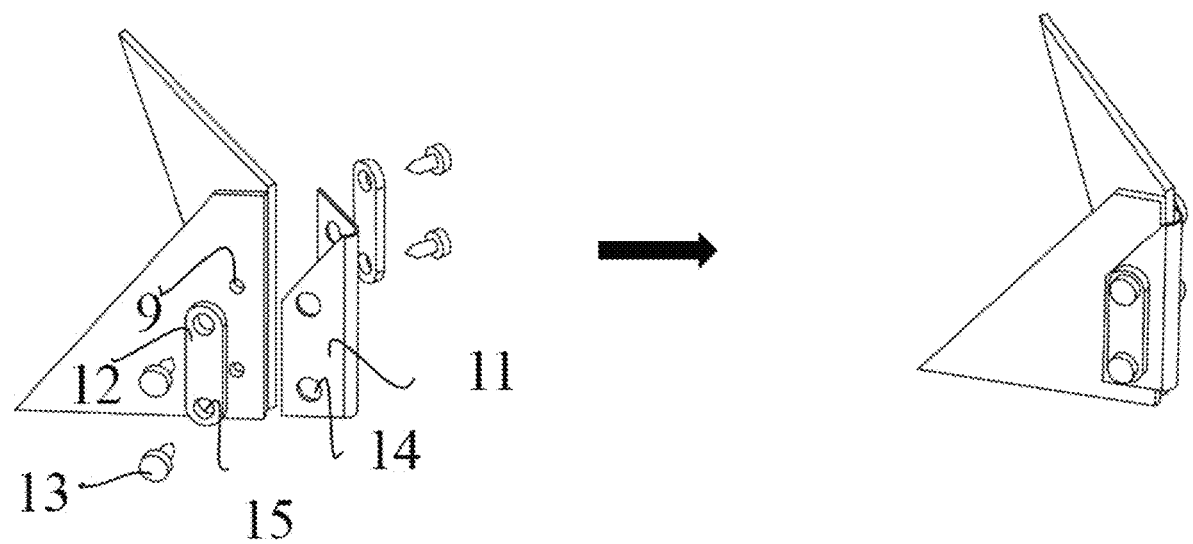
FIG. 9 is a schematic diagram of disassembled and assembled oblique hill creases.

The method for preparing the small-scale model of the buckling-controlled brace device with the rotationally symmetric cross section includes the following steps:

S100. a CNC machine tool cuts into sub-energy-dissipation section 3 on a flat steel plate along a panel group I 4 and a panel group II 5 split by the fifteenth edge (line segment BC) and sixteenth edge (line segment DC), wherein the panel group I 4 includes the ninth edge (line segment HB), the fifteenth edge (line segment BC), the sixteenth edge (line segment DC), the thirteenth edge (line segment JD), the eighth edge (line segment JG), the eleventh edge (line segment GC), and the fourth edge (line segment GH); the panel group II 5 includes the tenth edge (line segment BA), the second edge (line segment AF), the sixth edge (line segment FE), the fourteenth edge (line segment DE), the sixteenth edge (line segment DC), the twelfth edge (line segment CF), and the fifteenth edge (line segment BC); horizontal creases 6 are used in the interior of the panel group I 4 and panel group II 5, and the horizontal creases 6 only transfer displacement and do not transfer out-of-plane bending moment;

as shown in FIG. 8, a preparation method of horizontal creases 6 includes the following steps:

S110. the horizontal creases 6 on the panel group I 4 and the panel group II 5 are continuously and evenly drilled into several circular holes;

S120. the horizontal creases 6 of the circular holes 8 are locally annealed by an acetylene flame, to compensate for the loss of deformation capacity caused by the weakening of the cross section;

S130. after the annealing is completed, the panel group I 4 and the panel group II 5 are accurately bent to a specified angle along the horizontal creases 6 by a CNC bending machine; and S200. the panel group I 4 and the panel group II 5 in S100 are connected by oblique hill creases 7 to form the sub-energy-dissipation segments 3; the oblique hill creases 7 only transfer displacement and do not transfer out-of-plane bending moment;

as shown in FIG. 9, a preparation method of the oblique valley creases 7 includes the following steps:

S210. a thinner first connecting plate 11 with a first preformed clearance hole 14 is bent to a specified angle by the CNC bending machine;

S220. the two adjacent panels with a first preformed pilot hole 9 of the panel group I 4 and the panel group II 5 are placed in a hill shape, and the first connecting plate 11 is placed on a hill side;

S230. a first cushion plate 12 is arranged with a second preformed clearance hole 15 on a hill side of the first connecting plate 11;

S240. when assembling, the first self-tapping screw 13 is installed from outside to inside with a drill, self-tapping screw threads pass through the second preformed clearance hole 15 on the first cushion plate 12 and the first preformed clearance hole 14 on the first connecting plate 11 in turn, and a drilled hole is formed at the first pilot hole 9 on the two adjacent panels of the panel group I 4 and the panel group II 5, to make the screw threads bite tightly with the sides of the drilled hole. Under the fastening action of the first self-tapping screw 13 and the panels, the first connecting plate 11 and the first cushion plate 12 between the first self-tapping screw and the panels are fixed, to form oblique hill creases; and S300. the four groups of sub-energy-dissipation segments 3 in S200 are connected along a direction of the eleventh edge (line segment GC) to form an energy-dissipation segment of the rotationally symmetric tubular structure. The connection between the four groups of sub-energy-dissipation segments 3 is the oblique valley creases 21, and the oblique valley creases 21 transfer displacement and out-of-plane bending moment simultaneously.

Figure 10:
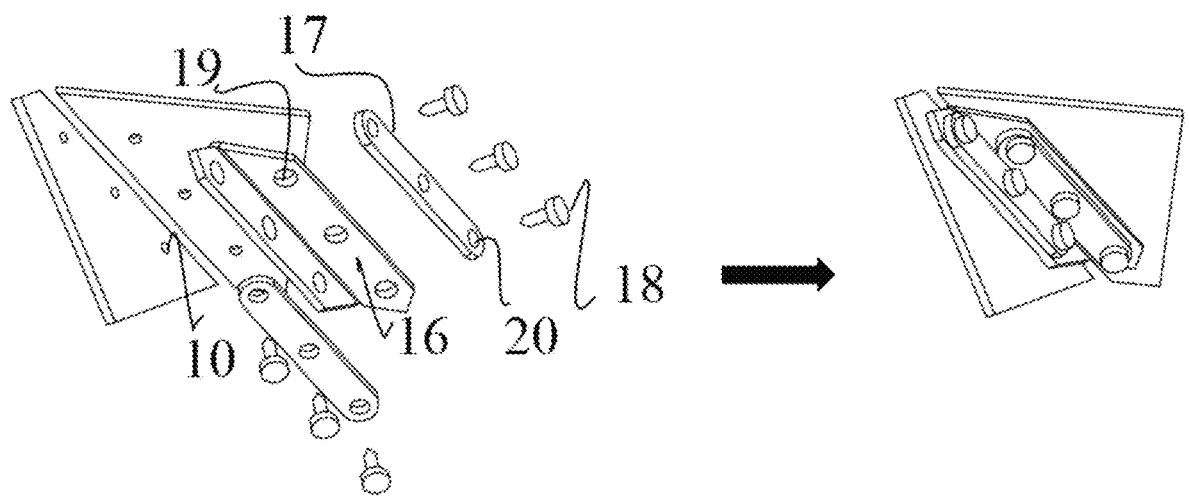
FIG. 10 is a schematic diagram of disassembled and assembled oblique valley creases.

As shown in FIG. 10, a preparation method of the oblique valley creases 21 includes the following steps:

S310. a thicker second connecting plate 16 with a third preformed clearance hole 19 is first bent to a specified angle by the CNC bending machine;

S320. the two adjacent panels with a second preformed pilot hole 10 of the panel group I 4 and the panel group II 5 are placed in a valley shape, and the second connecting plate 16 is placed on the valley side;

S330. a second cushion plate 17 with a fourth preformed clearance hole 20 is arranged on the valley side of the second connecting plate 16; and S340. when assembling, a second self-tapping screw 18 is installed from outside to inside with a drill, self-tapping screw threads pass through the fourth preformed clearance hole 20 of the second cushion plate 17 and the third preformed clearance hole 19 on the first connecting plate 16 in turn; a drilled hole is formed at the second pilot hole 10 on the two adjacent panels of the panel group I 4 and the panel group II 5, to make the screw threads bite tightly with the sides of the drilled hole. Under the fastening effect of the second self-tapping screw 18 and the panels, the second connecting plate 16 and the second cushion plate 17 between the second self-tapping screw and the panels are fixed, to form oblique valley creases.

The above technical solutions of the present disclosure are fully described. It should be noted that the specific implementation method of the present disclosure is not limited by the above description. All technical solutions developed by a person having ordinary skill in the art through equivalent structural, methodological, or functional modifications based on the inventive principles disclosed herein, including but not limited to equivalent substitutions and adaptations, shall be construed as falling within the scope of the present disclosure as defined by the appended claims.

What is claimed is:

1. A method for preparing a small-scale model of a buckling-controlled brace device with a rotationally symmetric cross section, wherein the small-scale model of the buckling-controlled brace device with the rotationally symmetric cross section comprises an energy-dissipation segment, the energy-dissipation segment comprises four groups of sub-energy-dissipation segments connected end to end in turn in a circumferential direction, a basic unit of the sub-energy-dissipation segments after flattening comprises two congruent parallelograms connected by overlapping edges, three edges of the parallelograms in a horizontal direction are all divided into two unequal lengths, both top and bottom edges are connected to overlapping edges by edges with the same length, and finally forming sixteen edges; a shape of the basic unit of the sub-energy-dissipation segments after flattening is two identical first parallelogram HAFG and second parallelogram GFEJ, in the first parallelogram, first, second, third and fourth edges correspond to line segment HA, line segment AF, line segment FG and line segment GH respectively, in the second parallelogram, fifth, sixth, seventh and eighth edges correspond to line segment GF, line segment FE, line segment EJ and line segment JG respectively, wherein the third edge and the fifth edge overlap, that is, the line segment FG is the line segment GF; point B, point C and point D are located on the line segment HA, the line segment FG and the line segment EJ, respectively, that is, the first edge line segment HA is divided into ninth edge line segment HB and tenth edge line segment BA connected to an end of the ninth edge line segment HB, third edge line segment FG is divided into eleventh edge line segment GC and twelfth edge line segment CF connected to an end of the eleventh edge line segment GC, a seventh edge line segment EJ is divided into a thirteenth edge line segment JD and a fourteenth edge line segment DE connected to an end of the thirteenth edge line segment JD; length of the ninth edge line segment HB, the twelfth edge line segment CF, and the thirteenth edge line segment JD is greater than length of the tenth edge line segment BA, the eleventh edge line segment GC, and the fourteenth edge line segment DE, respectively; the lengths of the ninth edge line segment HB, the twelfth edge line segment CF and the thirteenth edge line segment JD are all equal; and the ninth edge line segment HB is connected to the twelfth edge line segment CF through a fifteenth edge line segment BC, and the thirteenth edge line segment JD is connected to the twelfth edge line segment CF through a sixteenth edge line segment DC, and a length of the fifteenth edge line segment BC is equal to a length of the sixteenth edge line segment DC; in the basic unit of the sub-energy-dissipation segments after flattening, performing a valley fold at the fourth and eighth edges, and performing a hill fold at fifteenth and sixteenth edges, to form a basic origami unit, and the preparation method comprises following steps:

S100. a computer numerical control (CNC) machine tool cuts into the sub-energy-dissipation segments on a flat steel plate along a panel group I and a panel group II split by the fifteenth and sixteenth edges, wherein the panel group I comprises a ninth edge, the fifteenth edge, the sixteenth edge, a thirteenth edge, the eighth edge, a eleventh edge and the fourth edge; and the panel group II comprises a tenth edge, the second edge, the sixth edge, a fourteenth edge, the sixteenth edge, a twelfth edge and the fifteenth edge;

S200. connecting the panel group I and the panel group II in S100 by oblique hill creases, to form the sub-energy-dissipation segments; and S300. connecting the four groups of sub-energy-dissipation segments in S200 along a direction of the eleventh edge, to form an energy-dissipation segment of a rotationally symmetric tubular structure;

in S100, using horizontal creases in an interior of the panel group I and the panel group II, wherein the horizontal creases only transfer displacement and do not transfer out-of-plane bending moment;

a preparation method of the horizontal creases comprises:

S110. continuously and evenly drilling the horizontal creases on the panel group I and the panel group II into several circular holes;

S120. locally annealing the horizontal creases of the circular holes by an acetylene flame, to compensate for a loss of deformation capacity caused by a weakening of the cross section; and S130. after completing the annealing, accurately bending the panel group I and the panel group II to a specified angle along the horizontal creases by a CNC bending machine;

in S200, the oblique hill creases only transfer the displacement and do not transfer the out-of-plane bending moment;

a preparation method of the oblique hill creases comprises:

S210. bending a first connecting plate with a first preformed clearance hole to a specified angle by the CNC bending machine;

S220. placing two adjacent panels of the panel group I and the panel group II with a preformed first pilot hole in a hill shape, and placing the first connecting plate on a hill side;

S230. arranging a first cushion plate with a second preformed clearance hole on the hill side of the first connecting plate; and S240. when assembling, installing a first self-tapping screw from outside to inside with a drill, passing through the second preformed clearance hole on the first cushion plate and the first preformed clearance hole on the first connecting plate in turn via self-tapping screw threads, and forming a drilled hole at the first pilot hole on the two adjacent panels of the panel group I and the panel group II, to make the screw threads bite tightly with sides of the drilled hole;

in S300, a connection between the four groups of sub-energy-dissipation segments is oblique valley creases, and the oblique valley creases transfer displacement and out-of-plane bending moment simultaneously;

a preparation method of the oblique valley creases comprises:

S310. bending a second connecting plate with a third preformed clearance hole to a specified angle by the CNC bending machine;

S320. placing the two adjacent panels with a preformed second pilot hole of the panel group I and the panel group II in a valley shape, and placing the second connecting plate on a valley side;

S330. arranging a second cushion plate with a fourth preformed clearance hole on a valley side of the second connecting plate; and S340. when assembling, installing a second self-tapping screw from outside to inside with a drill, passing through the fourth preformed clearance hole on the second cushion plate and the third preformed clearance hole on the second connecting plate in turn via self-tapping screw threads, and forming a drilled hole at the second pilot hole on the two adjacent panels of the panel group I and the panel group II, to make the screw threads bite tightly with the sides of the drilled hole.

\* \* \* \* \*